(12) United States Patent
Tsukahara et al.

(10) Patent No.: US 10,887,553 B2
(45) Date of Patent: Jan. 5, 2021

(54) MONITORING SYSTEM AND MONITORING METHOD

(71) Applicant: PANASONIC I-PRO SENSING SOLUTIONS CO., LTD., Fukuoka (JP)

(72) Inventors: Shinichi Tsukahara, Fukuoka (JP); Hideaki Takahashi, Fukuoka (JP); Koji Kawamoto, Fukuoka (JP); Kosuke Shinozaki, Fukuoka (JP)

(73) Assignee: PANASONIC I-PRO SENSING SOLUTIONS CO., LTD., Fukuoka (JP)

( * ) Notice: Subject to any disclaimer, the term of this patent is extended or adjusted under 35 U.S.C. 154(b) by 0 days.

(21) Appl. No.: 16/275,787

(22) Filed: Feb. 14, 2019

(65) Prior Publication Data

US 2019/0268572 A1    Aug. 29, 2019

(30) Foreign Application Priority Data

Feb. 28, 2018    (JP) .................................. 2018-034023

(51) Int. Cl.
*H04N 7/18* (2006.01)
*G06K 9/00* (2006.01)

(52) U.S. Cl.
CPC ......... *H04N 7/181* (2013.01); *G06K 9/00288* (2013.01); *G06K 9/00362* (2013.01); *G06K 9/00711* (2013.01)

(58) Field of Classification Search
None
See application file for complete search history.

(56) References Cited

U.S. PATENT DOCUMENTS

| 2003/0067537 A1* | 4/2003 | Myers | G01B 11/2513 |
| | | | 348/47 |
| 2004/0240711 A1* | 12/2004 | Hamza | G06K 9/00288 |
| | | | 382/118 |
| 2008/0298643 A1* | 12/2008 | Lawther | G06K 9/00677 |
| | | | 382/118 |

(Continued)

FOREIGN PATENT DOCUMENTS

JP    2007-206898 A    8/2007

*Primary Examiner* — Heather R Jones
(74) *Attorney, Agent, or Firm* — Greenblum & Bernstein P.L.C.

(57) ABSTRACT

A monitoring system includes a plurality of entrance cameras that capture each of visitors from multiple different angles when the each of visitors enters a facility in which a plurality of intra-facility cameras are installed at respective prescribed positions, and a monitoring apparatus that accumulates visitor data which associates captured images of the each of visitors with identification information of the each of visitors, and monitors the each of visitors in the facility. The monitoring apparatus specifies one intra-facility camera installed at or near a position of detection of the abnormality as a near-abnormality-position intra-facility camera in response to a notice of detection of an abnormality in the facility, extracts one or more visitors found in a video captured by the near-abnormality-position intra-facility camera based on the visitor data; and employs the one or more visitors as security action target persons.

8 Claims, 11 Drawing Sheets

(56) References Cited

U.S. PATENT DOCUMENTS

2013/0279757 A1\* 10/2013 Kephart ............ G06K 9/00771
  382/105
2015/0334299 A1   11/2015 Tsuneno et al.
2017/0223302 A1\*  8/2017 Conlan ............... H04N 5/44504
2018/0300557 A1\* 10/2018 Rodenas ............ G06K 9/00711

\* cited by examiner

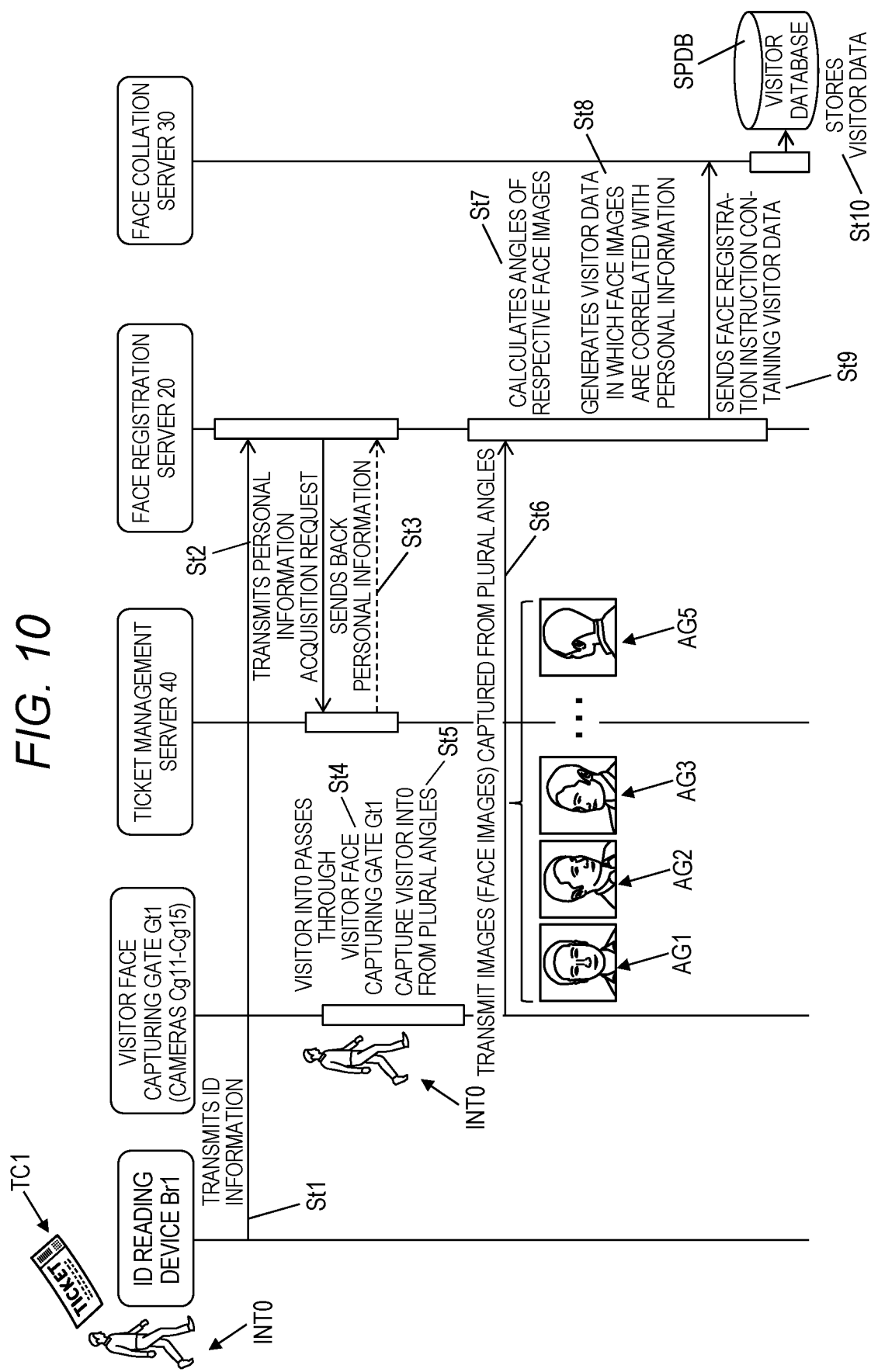

MONITORING SYSTEM AND MONITORING METHOD

BACKGROUND OF THE INVENTION

1. Field of the Invention

The present disclosure relates to a monitoring system and a monitoring method for monitoring visitors (or spectators) in a facility based on face images of visitors captured by plural cameras from plural angles when they entered the facility.

2. Background Art

JP-A-2007-206898 discloses a face authentication apparatus that judges whether a pedestrian as an authentication target is a person who is registered in advance by selecting a front face image from face images of the pedestrian captured by plural cameras from plural angles and collating the selected front face image with registered face images. With this face authentication apparatus, it suffices that only front face images be registered in advance and face authentication can be performed accurately even if an authentication target person is walking, for example.

However, in JP-A-2007-206898, no consideration is given to use face images captured from plural angles to narrow down the investigation to suspects or criminals of the incident when an incident or an accident (hereinafter referred to as an "incident or the like") has occurred in a closed facility (e.g., stadium) in which many (e.g., several tens of thousands of) visitors such as spectators exist. Although it is highly probable that the suspect or criminal stays in the facility immediately after the occurrence of the incident or the like, even with the technique of JP-A-2007-206898 it is difficult to monitor the suspects or criminals after an efficient narrowing-down operation.

SUMMARY OF THE INVENTION

The content of the present disclosure has been conceived in view of the above circumstances, and an object of the present disclosure is therefore to provide a monitoring system and a monitoring method that can efficiently support narrowing-down to suspects or criminals using face images captured by plural cameras from plural angles when each person entered a closed facility such as a stadium upon occurrence of an incident or the like in the facility, and thereby contribute to early solution of the incident or the like.

The present disclosure provides a monitoring system including a plurality of entrance cameras that capture each of visitors from multiple different angles when the each of visitors enters a facility in which a plurality of intra-facility cameras are installed at respective prescribed positions, and a monitoring apparatus that is connected to the plurality of entrance cameras so as to communicate with the plurality of entrance cameras, has a storage that accumulates visitor data which associates captured images of the each of visitors captured from the multiple different angles with identification information of the each of visitors, and monitors the each of visitors in the facility. The monitoring apparatus specifies one intra-facility camera installed at or near a position of detection of the abnormality among the plurality of intra-facility cameras as a near-abnormality-position intra-facility camera in response to a notice of detection of an abnormality in the facility, extracts one or more visitors found in a video captured by the near-abnormality-position intra-facility camera based on the visitor data, employs the one or more visitors as security action target persons, and transmits information on the security action target persons to portable terminals held by respective guards who patrol the facility.

The present disclosure also provides a monitoring method implemented by a monitoring system, the monitoring system including a plurality of entrance cameras that capture each of visitors from multiple different angles when the each of visitors enters a facility in which a plurality of intra-facility cameras are installed at respective prescribed positions, and a monitoring apparatus that is connected to the plurality of entrance cameras so as to communicate with the plurality of entrance cameras, has a storage that accumulates visitor data which associates captured images of the each of visitors captured from the multiple different angles with identification information of the each of visitors, and monitors the each of visitors in the facility. The method includes steps of determining one intra-facility camera installed at or near a position of detection of the abnormality among the plurality of intra-facility cameras as a near-abnormality-position intra-facility camera in response to a notice of detection of an abnormality in the facility, extracting one or more visitors found in a video captured by the near-abnormality-position intra-facility camera based on the visitor data, employing the one or more visitors as security action target persons, and transmitting information on the security action target persons to portable terminals held by respective guards who patrol the facility.

According to the present disclosure, it is possible to efficiently support narrowing-down to suspects or criminals using face images captured by plural cameras from plural angles when each person entered a closed facility such as a stadium upon occurrence of an incident or the like in the facility, and to thereby contribute to early solution of the incident or the like.

BRIEF DESCRIPTION OF THE DRAWINGS

FIG. 10 is a sequence diagram showing an example operation procedure of face registration in the monitoring system according to the embodiment 1.

DETAILED DESCRIPTION OF THE EXEMPLARY EMBODIMENT

A monitoring system and a monitoring method according to a specific embodiment of the present disclosure will be hereinafter described in detail by referring to the accompanying drawings when necessary. However, unnecessarily detailed descriptions may be avoided. For example, detailed descriptions of well-known items and duplicated descriptions of constituent elements having substantially the same ones already described may be omitted. These are to prevent the following description from becoming unnecessarily redundant and thereby facilitate understanding of those skilled in the art. The following description and the accompanying drawings are provided to allow those skilled in the art to understand the disclosure sufficiently and are not intended to restrict the subject matter set forth in the claims.

The embodiment is directed to a monitoring system that is installed in a closed facility (e.g., a stadium where a soccer game, for example, is played) to accommodate many (e.g., several tens of thousands of) visitors such as spectators. In this monitoring system, each visitor is shot by plural cameras from different angles when he or she enters the stadium passing through a gate (more specifically, visitor face capturing gate (described later)), visitor data each containing thus-captured face images etc. are generated and registered, and visitors in the stadium are monitored using the visitor data.

Figure 1:
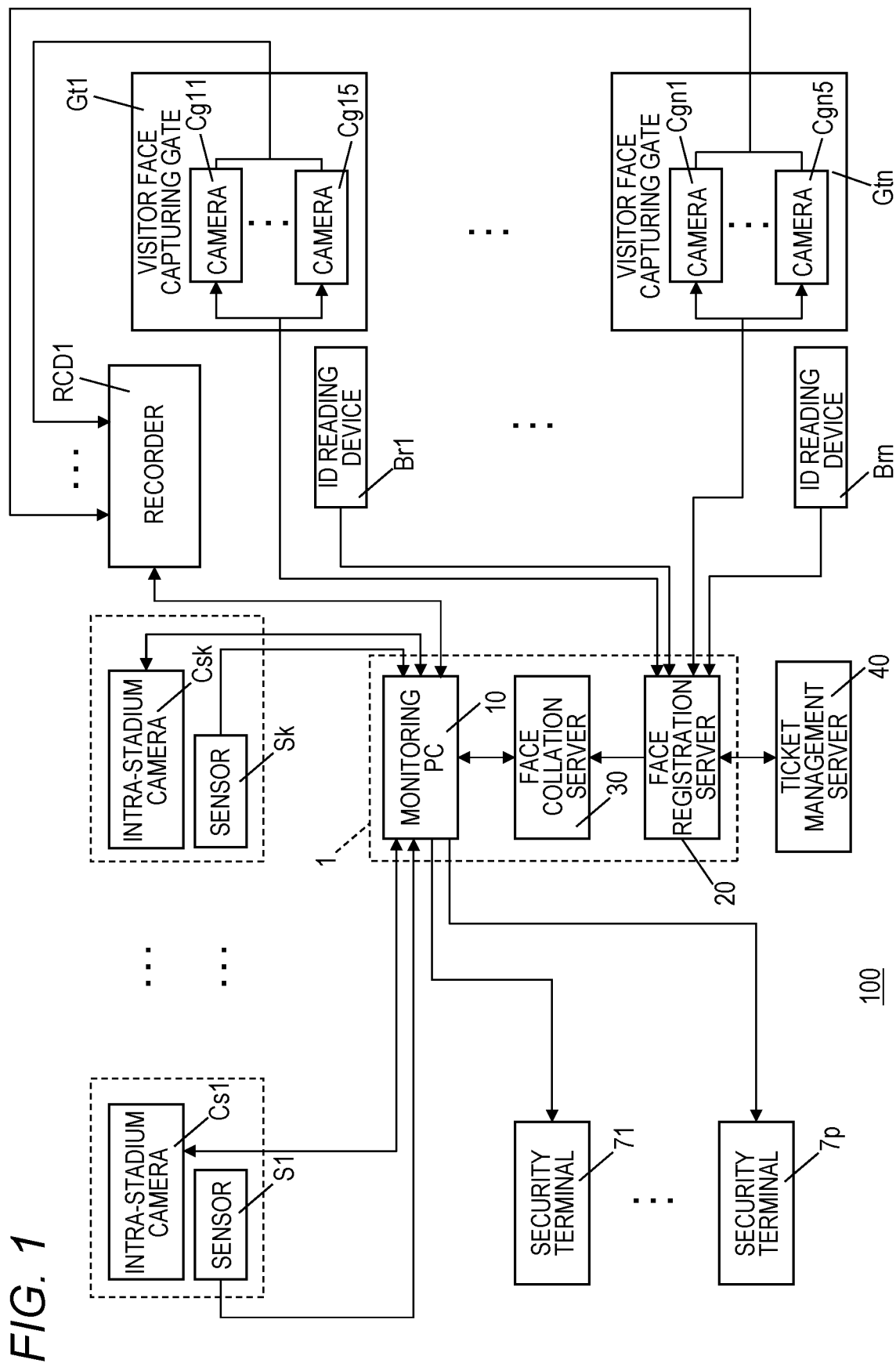
FIG. 1 is a block diagram showing an example system configuration of a monitoring system according to the embodiment 1.

FIG. 1 is a block diagram showing an example system configuration of a monitoring system (intra-facility monitoring system) 100 according to the embodiment 1. The monitoring system 100 is equipped with k sensors S1, . . . , Sk (k is an integer that is larger than or equal to 2) which are installed at prescribed positions in the stadium, k intra-stadium cameras Cs1, . . . , Csk, n visitor face capturing gates Gt1, . . . , Gtn (n is an integer that is larger than or equal to 2) which are installed near respective entrances/exits of the stadium, a recorder RCD1, and a monitoring apparatus 1.

The sensors S1-Sk may be either of the same type or different types. Connected to a monitoring PC 10 so as to be able to communicate with it, the sensors S1-Sk detect states (e.g., normal or abnormal) of nearby regions in the stadium, respectively, and convey (transmit) detection results to the monitoring PC 10. Each of the sensors S1-Sk detects occurrence of an abnormal state (e.g., an incident or an accident (hereinafter referred to as an "incident or the like") in the stadium on the basis of a sensing result. The sensors S1-Sk can detect one of, for example, smoke, a temperature that is higher than a prescribed temperature, humidity that is higher than prescribed humidity, and a collision due to a drop of a heavy object. Events to be detected by the sensors S1-Sk are not limited to the above. Upon detecting occurrence of an abnormality in the stadium, the sensors S1-Sk transmit an abnormality detection notice to the monitoring PC 10.

Each of the intra-stadium cameras Cs1-Csk is installed fixedly at a prescribed position in the stadium and captures subjects (e.g., plural visitors) located within an angle of view that was set when it was installed. The internal configurations of the intra-stadium cameras Cs1-Csk are the same and will be described later in detail with reference to FIG. 4. In the embodiment, intra-stadium cameras Cs1-Csk are installed in the same number as the sensors S1-Sk and each intra-stadium camera and a corresponding sensor (e.g., the intra-stadium camera Cs1 and the sensor S1 . . . , or the intra-stadium camera Csk and the sensor Sk) are correlated with each other and installed at the same position or positions very close to each other. It is highly probable that when the sensor S1, for example, detects an abnormality (e.g., a bomb explosion incident) in the stadium, an image of a suspect or a criminal who has caused the abnormality is included in a video captured by the intra-stadium camera Cs1 which is correlated with the sensor S1.

The visitor face capturing gates Gt1-Gtn (see FIG. 2) are installed near plural respective entrances/exits (what are called "gates") of the stadium so as to be correlated with respective ID reading devices Br1, . . . , Bm which can read a barcode that is, for example, printed on a ticket (see FIG. 10) that is held by a visitor to enter the stadium. That is, the visitor face capturing gates Gt1-Gtn are installed in the same number as the ID reading devices Br1-Bm and each visitor face capturing gate and a corresponding ID reading device (e.g., the visitor face capturing gate Gt1 and the ID reading device Br1, . . . or the visitor face capturing gate Gtn and the ID reading device Bm) are correlated with each other and installed at the same position or positions very close to each other.

The ID reading devices Br1-Bm, which are connected to a face registration server 20 so as to be able to communicate with it, read a ticket held by a visitor and transmit, to the face registration server 20, ID information, obtained by the reading, of the visitor who purchased the ticket. For example, the ID information contains various kinds of information such as a ticket identification information (e.g., indicated by a barcode that is, for example, printed on a ticket TC1), the name of a visitor who purchased the ticket TC1, and a purchase date.

Figure 2:
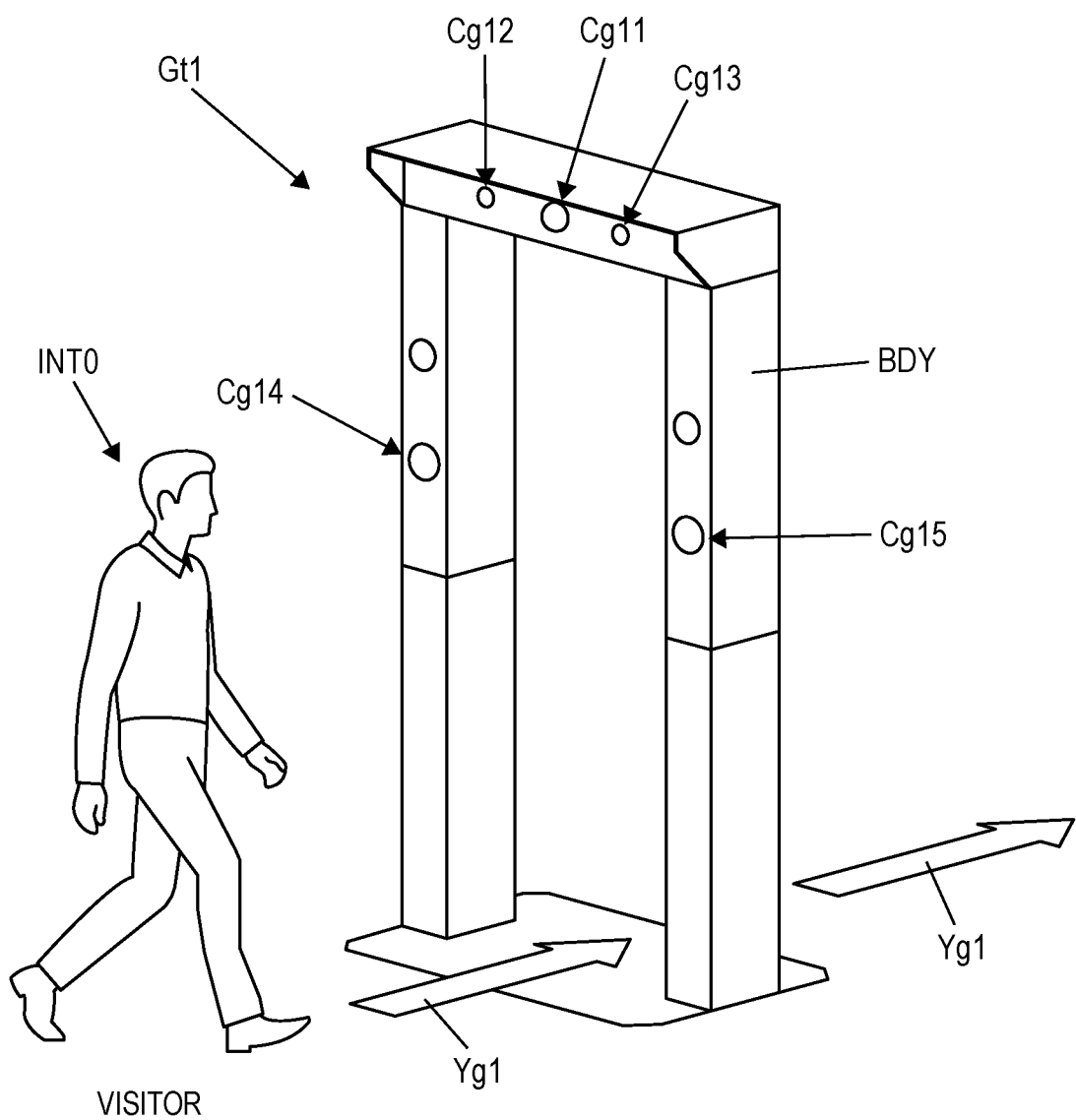
FIG. 2 shows an appearance of examples of a visitor face capturing gate and plural cameras attached to it.
Figure 8:
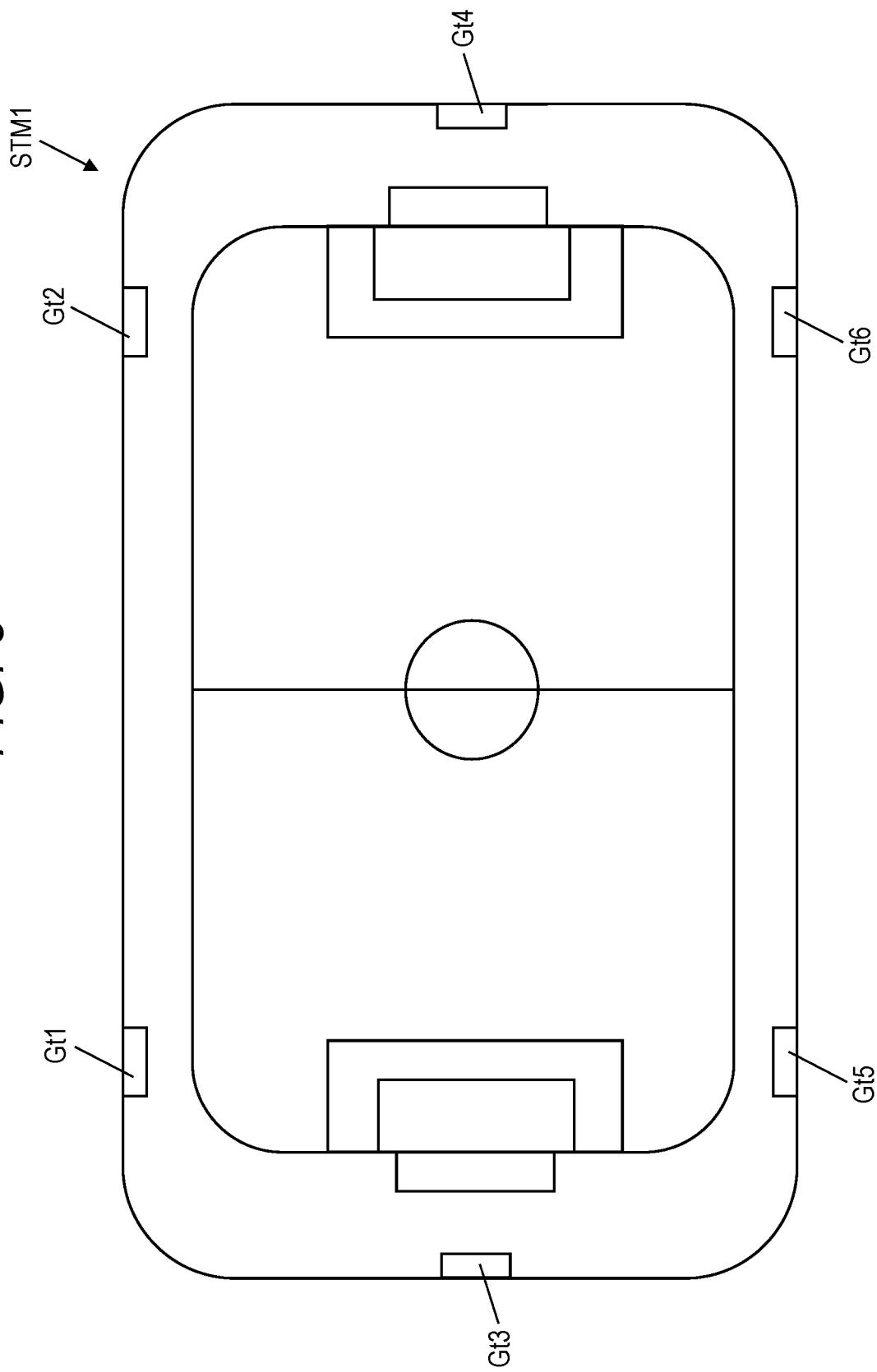
FIG. 8 is a plan view (bird's eye view) of a stadium in which the monitoring system according to the embodiment 1 is installed.

FIG. 2 shows an appearance of examples of the visitor face capturing gate Gt1 and plural cameras (entrance cameras) Cg11, Cg12, Cg13, Cg14, and Cg15 attached to it. FIG. 8 is a plan view (bird's eye view) of a stadium STM1 in which the monitoring system 100 according to the embodiment is installed. In the example of FIG. 8, the number n is equal to 6, that is, the stadium STM1 has six entrances/exits and the same number of visitor face capturing gates. More specifically, visitor face capturing gates Gt1-Gt6 are installed near first to sixth entrances/exits, respectively. It goes without saying that the number of entrances/exits provided in the stadium STM1 is not limited to six.

The visitor face capturing gates Gt1-Gtn have the same gate main body BDY (see FIG. 2). The description to be made with reference to FIG. 2 will be simplified by showing the visitor face capturing gate Gt1 in FIG. 2. The visitor face capturing gate Gt1 has a U-shaped gate main body BDY, for example, and the plural cameras Cg11-Cg15 are incorporated in its gate main body BDY. Likewise, the visitor face capturing gate Gtn has a U-shaped gate main body BDY, for example, and plural cameras Cgn1-Cgn5 are incorporated in its gate main body BDY.

The cameras Cg11-Cg15, which are connected to the recorder RCD1 and the face registration server 20 so as to be able to communicate with them, capture, from different angles, a visitor INT0 who is passing through the visitor face capturing gate Gt1 (e.g., in a direction indicated by arrow Yg1) to enter the stadium STM1. In other words, the cameras Cg11-Cg15 are installed in such a manner that the optical axes of incorporated lenses are in different directions, whereby as mentioned above the cameras Cg11-Cg15 can capture each visitor from different directions. The cameras Cg11-Cg15 transmit images captured from different angles to the recorder RCD1 and the face registration server 20.

The recorder RCD1, which is connected to the cameras incorporated in the visitor face capturing gates Gt1-Gtn (e.g., cameras Cg11-Cg15, . . . , Cgn1-Cgn5) so as to be able to communicate with them, records data of images of a visitor captured by each set of cameras. Also connected to the monitoring PC 10 so as to be able to communicate with it, the recorder RCD1 may record data of videos that are captured by the respective intra-stadium cameras Cs1-Csk and received by the monitoring PC 10 and show situations in the stadium STM1.

The monitoring apparatus 1 is equipped with the monitoring PC 10, the face registration server 20, and a face collation server 30. In other words, each of the monitoring PC 10, the face registration server 20, and the face collation server 30 is an example of the term "monitoring apparatus" used in the claims.

The monitoring PC 10 can receive a manipulation of a user (e.g., an observer who performs monitoring in a backyard monitoring room, for example, of the stadium STM1) of the monitoring system 100, and is a personal computer (PC), for example. Connected to the sensors S1-Sk and the intra-stadium cameras Cs1-Csk so as to be able to communicate with them, the monitoring PC 10 receives videos captured and transmitted from the respective intra-stadium cameras Cs1-Csk and displays them on a display DP1 (see FIG. 5) according to manipulations of the user (mentioned above; this term will have the same meaning in the following description) to enable monitoring of visitors in the stadium STM1. Furthermore, the monitoring PC 10 enables recognition of situations in the stadium STM1 by receiving and acquiring detection results transmitted from the respective sensors S1-Sk. A detailed internal configuration of the monitoring PC 10 will be described later with reference to FIG. 5.

The face registration server 20 is a server or a PC, for example. Connected to the visitor face capturing gates Gt1-Gtn and the ID reading devices Br1-Bm so as to be able to communicate with them, the face registration server 20 receives and acquires, from each of the sets of cameras Cg11-Cg15 . . . . , or Cgn1-Cgn5, images, captured from five different angles, for example, of each visitor who passes through one of the visitor face capturing gates Gt1-Gtn of the stadium STM1. The face registration server 20 cuts out face images from the acquired images of each visitor and generates, for each visitor, visitor data in which the cut-out face images are correlated with personal data of the visitor acquired from a ticket management server 40.

The face registration server 20 sends visitor data generated for respective visitors to the face collation server 30 to have the visitor data registered in the face collation server 30. The face registration server 20 may be part of the face collation server 30, in which case the face registration server 20 is prevented from existing as a separate, physical unit in the monitoring system 100. The details of the internal configuration of the face registration server 20 will be described later with reference to FIG. 6.

The face collation server 30 is a server or a PC, for example. Connected to the monitoring PC 10 and the face registration server 20 so as to be able to communicate with them, the face collation server 30 searches for, through collation, each visitor data whose face images coincide with a face image of one of all persons (i.e., all visitors) that are found in a video (described later) extracted by the monitoring PC 10 on the basis of a collation request from the monitoring PC 10 when, for example, an abnormality (e.g., bomb explosion incident) is detected somewhere in the stadium STM1. The face collation server 30 returns, as a response, visitor data of respective visitors obtained as a search result (collation result) to the monitoring PC 10. The face collation server 30 registers (accumulates) the visitor data of the respective visitors generated by the face registration server 20 in a visitor database SPDB. A detailed internal configuration of the face collation server 30 will be described later with reference to FIG. 7.

The ticket management server 40 is a server or a PC, for example. Connected to the face registration server 20 so as to be able to communicate with it, the ticket management server 40 stores pieces of ticket information of respective visitors who requested attendance to various events including games such as soccer games to be held in the stadium STM1. Ticket information of each visitor contains a ticket identification information (e.g., a barcode that is, for example, printed on a ticket), a name, an age, a gender, an address, a telephone number, etc. of a visitor who purchased the ticket. The ticket management server 40 returns ticket information to the face registration server 20 in response to a personal information acquisition request from the face registration server 20.

Security terminals 71 . . . . , 7p (p is an integer that is larger than or equal to 2), which are an example of the term "portable terminals" used in the claims, are portable terminals such as smartphones or dedicated security terminals such as transceivers and are carried by respective guards. The guards patrol the stadium STM1 on a regular basis and check for a suspicious person, a suspicious object discarded, or the like. That is, p guards perform security work carrying the respective security terminals 71-7p.

The security terminals 71-7p are connected to the monitoring PC 10 so as to be able to communicate with it. The security terminals 71-7p receive, from the monitoring PC 10, and acquire visitor data (described later) obtained by the face collation server 30 through collation. As a result, the guards can recognize characteristic information of suspects or criminals who may have caused the abnormality (e.g., bomb explosion incident) detected in the stadium STM1 on the basis of the visitor data acquired by the respective security terminals 71-7p carried by themselves, and hence can patrol efficiently to find suspicious persons.

Figure 3:
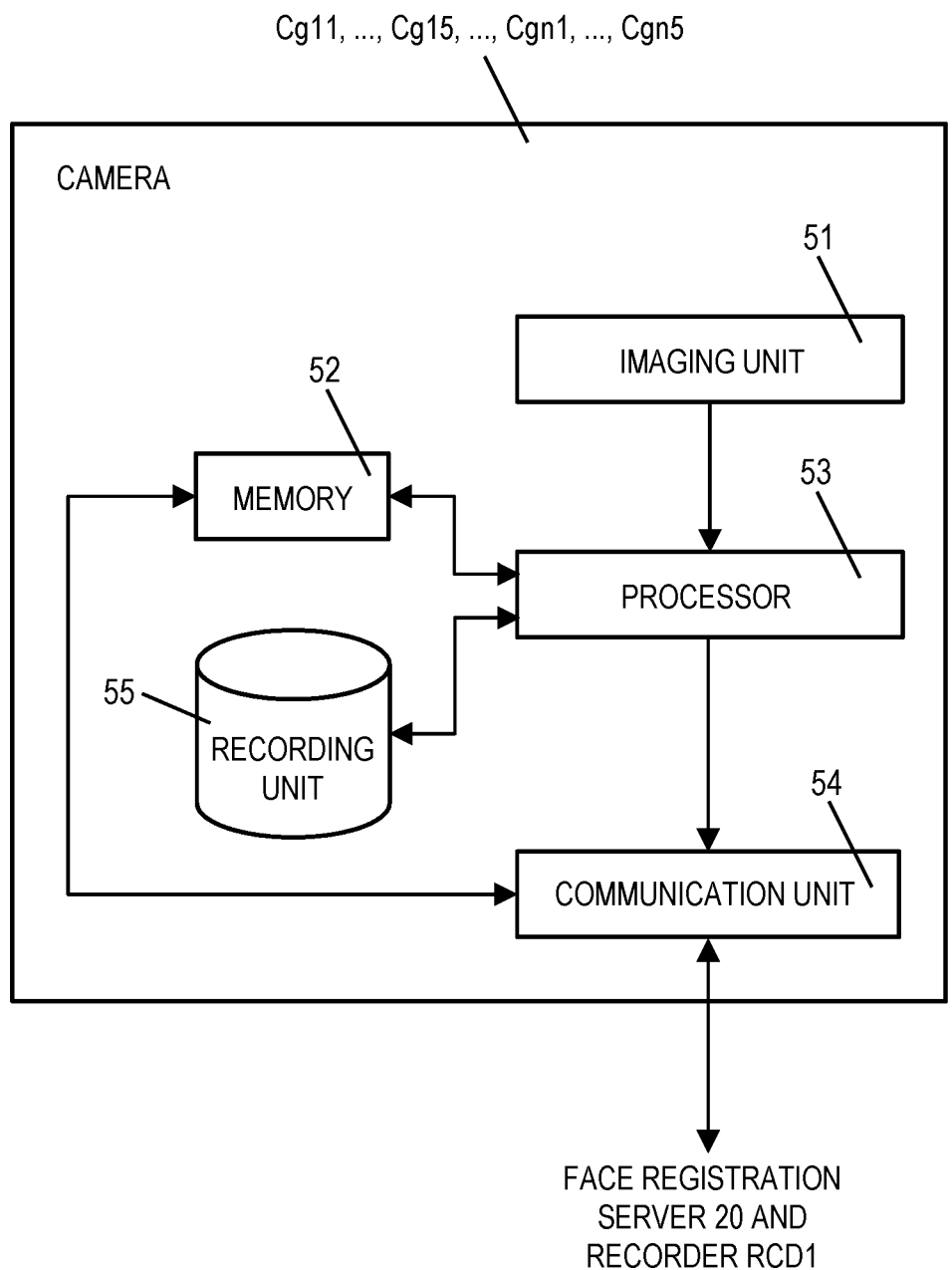
FIG. 3 is a block diagram showing an example hardware configuration of each camera.

FIG. 3 is a block diagram showing an example hardware configuration of each of the cameras Cg11-Cg15, . . . , Cgn1-Cgn5. Since the cameras Cg11-Cg15, . . . , Cgn1-Cgn5 have the same hardware configuration, the description to be made with reference to FIG. 3 will be directed to the camera Cg11; however, this description holds even if the camera Cg11 is replaced by any of the camera Cg12-Cg15, . . . , and Chn1-Cgn5. The camera Cg11 is equipped with an imaging unit 51, a memory 52, a processor 53, a communication unit 54, and a recording unit 55.

The imaging unit 51 is equipped with a focusing lens and a solid-state imaging device such as a CCD image sensor or a CMOS (complementary metal-oxide-semiconductor) image sensor. The imaging unit 51 outputs subject video data generated based on capturing by the solid-state imaging device to the processor 53 all the time while the camera Cg11 is power-on. The imaging unit 51 may be equipped with a mechanism for changing the capturing direction and the zoom magnification of the camera Cg11 (e.g., pan/tilt/zoom mechanism).

The memory 52, which is composed of, for example, a RAM (random access memory) and a ROM (read-only memory), stores programs and data that are necessary for operation of the camera Cg11 and temporarily stores information, data, or the like generated during operation of the camera Cg11. The RAM is a work memory that is used while, for example, the processor 53 is in operation. For example, the ROM is stored with, in advance, programs and data for controlling the processor 53. The memory 52 is stored with, for example, identification information (e.g., serial number) for identification of the camera Cg11l and various kinds of setting information.

For example, the processor 53 is a CPU (central processing unit), an MPU (micro processing unit), a DSP (digital signal processor), or an FPGA (field-programmable gate array). The processor 53, which functions as a control unit of the camera Cg11, performs control processing for controlling operation of the other units of the camera Cg11 in a centralized manner, processing for data input from and output to the other units of the camera Cg11, data computation (calculation) processing, and data storing processing. The processor 53 operates according to the programs and data stored in the memory 52.

Operating using the memory 52, the processor 53 acquires current time information, performs various kinds of known image processing on data of images captured by the imaging unit 51 and records resulting data in the recording unit 55 in such a manner that it is correlated with current time information as a capturing time. Although not shown in FIG. 3, in the case where the camera Cg11 has a GPS (global positioning system) receiving unit, the processor 53 may acquire current position information from the GPS receiving unit and record processed video data in such a manner that it is further correlated with the position information.

The GPS receiving unit will now be described briefly. The GPS receiving unit receives satellite signals that are transmitted from plural respective GPS transmitters (e.g., installed in four navigation satellites) and each of which includes a signal transmission time and position coordinates. Using these satellite signals, the GPS receiving unit calculates current position coordinates of the camera Cg11 and reception times of the respective satellite signals. These calculations may be performed by, instead of the GPS receiving unit, a processor (e.g., processor 53) that receives outputs of the GPS receiving unit. The pieces of reception time information may also be used for correction of a system time of the camera Cg11. The system time is used for, for example, recording of capturing times of images constituting a video captured. This description of the GPS receiving unit also applies to the following description.

The processor 53 may control the capturing conditions of the imaging unit 51 according to an external control command received from the communication unit 54. For example, if the external control command is one that instructs to change the capturing direction, the processor 53 changes the capturing direction of the imaging unit 51 at the time of capturing according to the control command. If the external control command is one that instructs to change the zoom magnification, the processor 53 changes the zoom magnification of the imaging unit 51 at the time of capturing according to the control command. If the external control command is one that instructs to perform processing of following a specified subject, the processor 53 performs processing of following the specified subject according to the control command using video data recorded in the recording unit 55. When receiving plural kinds of control commands, the processor 53 may perform plural kinds of processing according to the respective control commands.

The processor 53 extracts (cuts out) face images of persons included in images captured and recorded in the recording unit 55 from the recorded images and transmits data of the extracted face images to the face registration server 20 repeatedly via the communication unit 54. The processor 53 also transmits data of a video captured by the imaging unit 51 to the face registration server 20 repeatedly via the communication unit 54. The term "to transmit data repeatedly" is not limited to transmitting data every time a prescribed constant time elapses and includes transmitting data every time one of predetermined irregular times elapses and also includes a case that sending of each data is completed by plural times of transmissions. This also applies to the following description.

The communication unit 54, which is a communication circuit for communication with each of the face registration server 20 and the recorder RCD1, transmits data of images captured, a video captured, or face images recorded in the recording unit 55 to the face registration server 20 or the recorder RCD1 on the basis of an instruction from the processor 53.

The recording unit 55 is a semiconductor memory (e.g., flash memory), an HDD (hard disk drive), or an SSD (solid-state drive) incorporated in the camera Cg11 or an external storage medium (i.e., a storage medium not incorporated in the camera Cg11) such as a memory card (e.g., SD card). The recording unit 55 records data of images captured or a video captured and face images generated by the processor 53 in such a manner that the data is correlated with identification information of the camera Cg1 and capturing time information. The recording unit 55 may continue to store video data by always holding video data of a prescribed period (e.g., 30 seconds) by pre-buffering and overwriting past video data a prescribed time (e.g., 30 seconds) or more before the current time. Where the recording unit 55 is a memory card, it can be inserted into and removed from the body of the camera Cg11 when desired.

Figure 4:
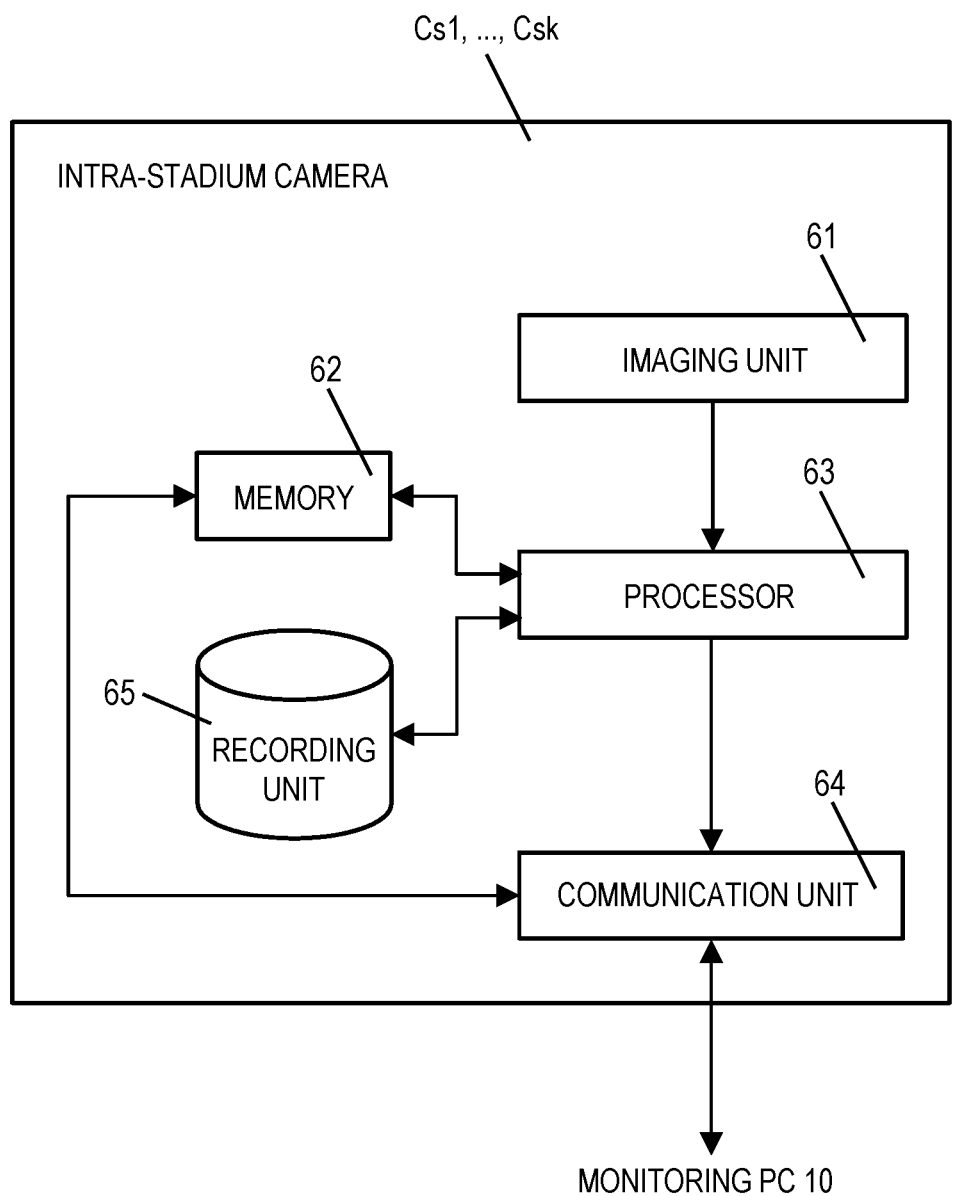
FIG. 4 is a block diagram showing an example hardware configuration of each intra-stadium camera.

FIG. 4 is a block diagram showing an example hardware configuration of each of the intra-stadium cameras Cs1-Csk. Since the intra-stadium cameras Cs1-Csk have the same hardware configuration, the description to be made with reference to FIG. 4 will be directed to the intra-stadium camera Cs1; however, this description holds even if the intra-stadium camera Cs1 is replaced by any of the intra-stadium cameras Cs2-Csk. The intra-stadium camera Cs1, which is an example of the term "intra-facility camera" used in the claims, is equipped with an imaging unit 61, a memory 62, a processor 63, a communication unit 64, and a recording unit 65.

The imaging unit 61 is equipped with a focusing lens and a solid-state imaging device such as a CCD image sensor or a CMOS image sensor. The imaging unit 61 outputs subject video data generated by capturing by the solid-state imaging device to the processor 63 all the time while the intra-stadium camera Cs is power-on. The imaging unit 61 may be equipped with a mechanism for changing the capturing direction and the zoom magnification of the intra-stadium camera Cs1 (e.g., pan/tilt/zoom mechanism).

The memory 52, which is composed of, for example, a RAM and a ROM, stores programs and data that are necessary for operation of the intra-stadium camera Cs1 and temporarily stores information, data, or the like generated during operation of the intra-stadium camera Cs1. The RAM is a work memory that is used while, for example, the processor 63 is in operation. For example, the ROM is stored with, in advance, programs and data for controlling the processor 63. The memory 62 is stored with, for example, identification information (e.g., serial number) for identification of the intra-stadium camera Cs and various kinds of setting information.

For example, the processor 63 is a CPU, an MPU, a DSP, or an FPGA. The processor 63, which functions as a control unit of the intra-stadium camera Cs1, performs control processing for controlling operation of the other units of the intra-stadium camera Cs1 in a centralized manner, processing for data input from and output to the other units of the intra-stadium camera Cs1, data computation (calculation) processing, and data storing processing. The processor 63 operates according to the programs and data stored in the memory 62.

Operating using the memory 62, the processor 63 acquires current time information, performs various kinds of known image processing on data of images captured by the imaging unit 61 and records resulting data in the recording unit 65 in such a manner that it is correlated with current time information as a capturing time. Although not shown in FIG. 4, in the case where the intra-stadium camera Cs1 has a GPS receiving unit (described above), the processor 63 may acquire current position information from the GPS receiving unit and record processed video data in such a manner that it is further correlated with the position information.

The processor 63 may control the capturing conditions of the imaging unit 61 according to an external control command received from the communication unit 64. For example, if the external control command is one that instructs to change the capturing direction, the processor 63 changes the capturing direction of the imaging unit 61 at the time of capturing according to the control command. If the external control command is one that instructs to change the zoom magnification, the processor 63 changes the zoom magnification of the imaging unit 61 at the time of capturing according to the control command. If the external control command is one that instructs to perform processing of following a specified subject, the processor 63 performs processing of following the specified subject according to the control command using video data recorded in the recording unit 65. When receiving plural kinds of control commands, the processor 63 may perform plural kinds of processing according to the respective control commands.

The processor 63 extracts (cuts out) face images of persons included in images captured and recorded in the recording unit 65 from the recorded images and transmits data of the extracted face images to the monitoring PC 10 repeatedly via the communication unit 64. The processor 63 also transmits data of a video captured by the imaging unit 61 to the monitoring PC 10 repeatedly via the communication unit 64.

The communication unit 64, which is a communication circuit for communication with the monitoring PC 10, transmits data of images captured, a video captured, or face images recorded in the recording unit 65 to the monitoring PC 10 on the basis of an instruction from the processor 63. When receiving a video acquisition request (see FIG. 11) from the monitoring PC 10, the communication unit 64 outputs it to the processor 63.

The recording unit 65 is a semiconductor memory (e.g., flash memory), an HDD, or an SSD incorporated in the intra-stadium camera Cs1 or an external storage medium (i.e., a storage medium not incorporated in the intra-stadium camera Cs1) such as a memory card (e.g., SD card). The recording unit 65 records data of images captured or a video captured and face images generated by the processor 63 in such a manner that the data is correlated with identification information of the intra-stadium camera Cs1 and capturing time information. The recording unit 65 may continue to store video data by always holding video data of a prescribed period (e.g., 30 seconds) by pre-buffering and overwriting past video data a prescribed time (e.g., 30 seconds) or more before the current time. Where the recording unit 65 is a memory card, it can be inserted into and removed from the body of the intra-stadium camera Cs1 when desired.

Figure 5:
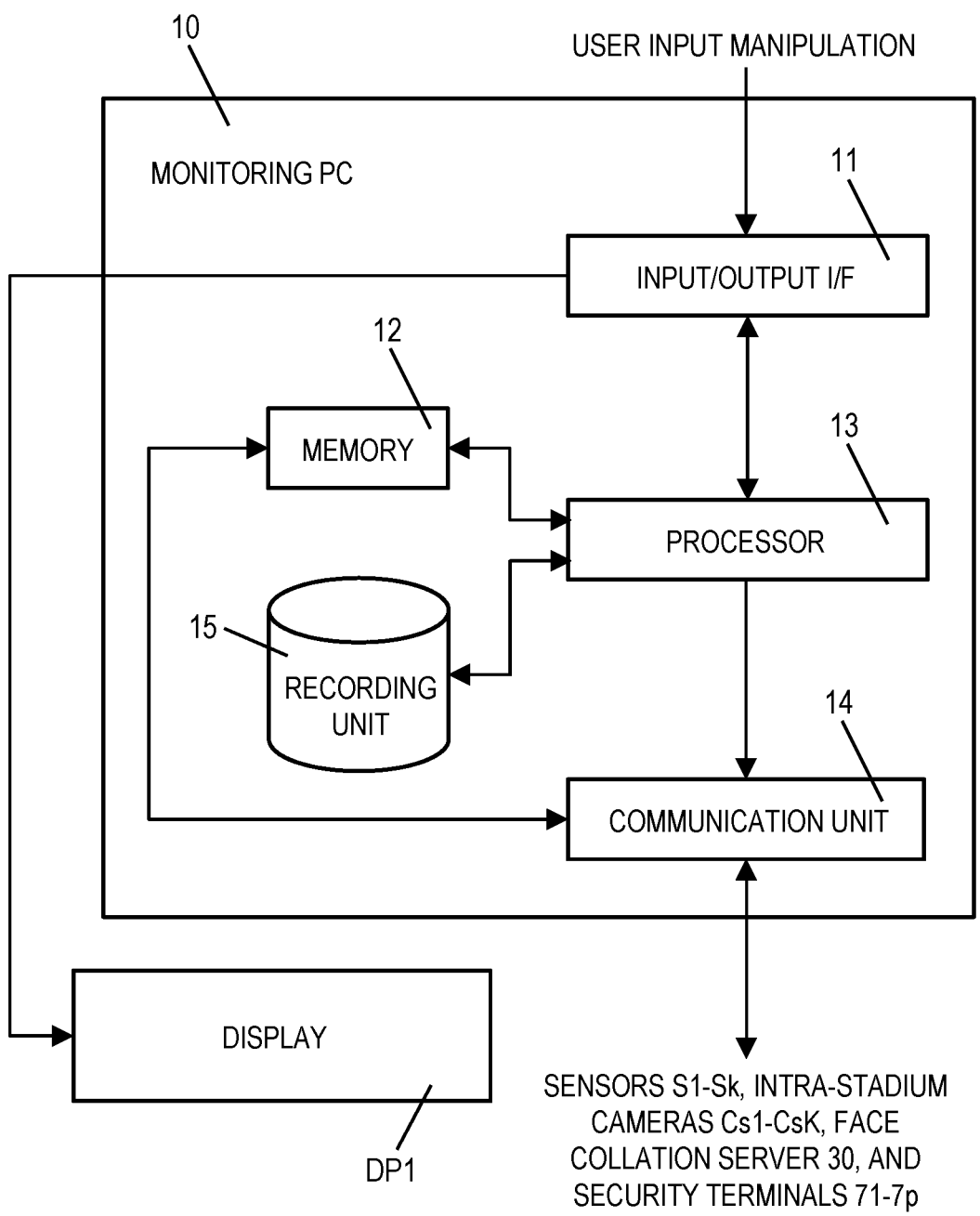
FIG. 5 is a block diagram showing an example hardware configuration of a monitoring PC.

FIG. 5 is a block diagram showing an example hardware configuration of the monitoring PC 10. The monitoring PC 10, which is an example of the term "monitoring apparatus 1" used in the claims, is equipped with an input/output interface 11, a memory 12, a processor 13, a communication unit 14, and a recording unit 15. Although in FIG. 5 a display DP1 is disposed outside the monitoring PC 10, it may be included in the monitoring PC 10.

As described above, the monitoring PC 10 is an information processing device that is installed in the backyard monitoring room, for example, of the stadium STM1 and can receive a manipulation of a user, that is, an observer who performs monitoring in the monitoring room, for example. In the event of an abnormality (e.g., bomb explosion incident) in the stadium STM1, the monitoring PC 10 displays, on the display DP1, a video captured by an intra-stadium camera that is located at or near a position where the abnormality has occurred. Looking at displayed video captured by the intra-stadium camera, the observer collects various kinds of information relating to the position where the abnormality has occurred.

The input/output interface 11 functions as an interface for input of data or information from the monitoring PC 10 and an external device (e.g., manipulation unit (not shown)). For example, the input/output interface 11 receives a signal from a manipulation unit (not shown) that is used by a user to perform an input manipulation and detects the input manipulation of the user. The manipulation unit is formed by using a mouse, a keyboard, etc. In FIG. 5, the term "interface" is abbreviated as "I/F" for convenience, that is, to simplify the notation. The input/output interface 11 outputs, to the processor 13, a signal corresponding to a user input manipulation. The input/output interface 11 also functions as an interface for output of data or information from the monitoring PC 10 to an external device (e.g., display DP1), and outputs, to the display DP1, video data that is output from the processor 13.

The memory 12, which is composed of, for example, a RAM and a ROM, stores programs and data that are necessary for operation of the monitoring PC 10 and temporarily stores information, data, or the like generated during operation of the monitoring PC 10. The RAM is a work memory that is used while, for example, the processor 13 is in operation. For example, the ROM is stored with, in advance, programs and data for controlling the processor 13. The memory 12 is stored with, for example, identification information (e.g., serial number) for identification of the monitoring PC 10 and various kinds of setting information.

For example, the processor 13 is a CPU, an MPU, a DSP, or an FPGA. The processor 13, which functions as a control unit of the monitoring PC 10, performs control processing for controlling operation of the other units of the monitoring PC 10 in a centralized manner, processing for data input from and output to the other units of the monitoring PC 10, data computation (calculation) processing, and data storing processing. The processor 13 operates according to the programs and data stored in the memory 12.

Operating using the memory 12, the processor 13 acquires current time information and displays video data transmitted from each of the intra-stadium cameras Cs1, . . . , Csk on the display DP1 via the input/output interface 11. If a face region of a person in a video is specified by a user manipulation while the video is displayed on the display DP1, the processor 13 generates data of a cut-out face image of the specified face region and transmits a collation request including the face image data to the face collation server 30 via the communication unit 14.

The communication unit 14 is a communication circuit for enabling communication with the sensors S1-Sk, the intra-stadium cameras Cs1-Csk, the face collation server 30, and the security terminals 71-7p. The communication unit 14 transmits a collation request including face image data held in memory 12 or the recording unit 15 to the face collation server 30 on the basis of an instruction from the processor 13. The communication unit 14 receives detection result information transmitted from each of the sensors S1-Sk and outputs it to the processor 13. The communication unit 14 receives video data transmitted from each of the intra-stadium cameras Cs1-Csk and outputs it to the processor 13. Furthermore, the communication unit 14 transmits a security action instruction (see FIG. 11) generated by the processor 13 to each of the security terminals 71-7p on the basis of an instruction from the processor 13.

The recording unit 15 is a semiconductor memory (e.g., flash memory), an HDD, or an SSD incorporated in the monitoring PC 10 or an external storage medium (i.e., a storage medium not incorporated in the monitoring PC 10) such as a memory card (e.g., SD card). The recording unit 15 records data of images captured or a video captured and face images generated by the processor 13 in such a manner that the data is correlated with identification information of a camera or cameras and capturing time information. Where the recording unit 15 is a memory card, it can be inserted into and removed from the body of the monitoring PC 10 when desired.

The recording unit 15 holds information relating to installation positions of the plural sets of a sensor and an intra-stadium camera that are installed in the stadium STM1 together with each other. For example, holds identification information of each of a sensor and an intra-stadium camera constituting each set.

The display DP1, which is a display device such as an LCD (liquid crystal display) or an organic EL (electroluminescence) display, displays data of various kinds of image or video captured that is sent from the processor 13.

Figure 6:
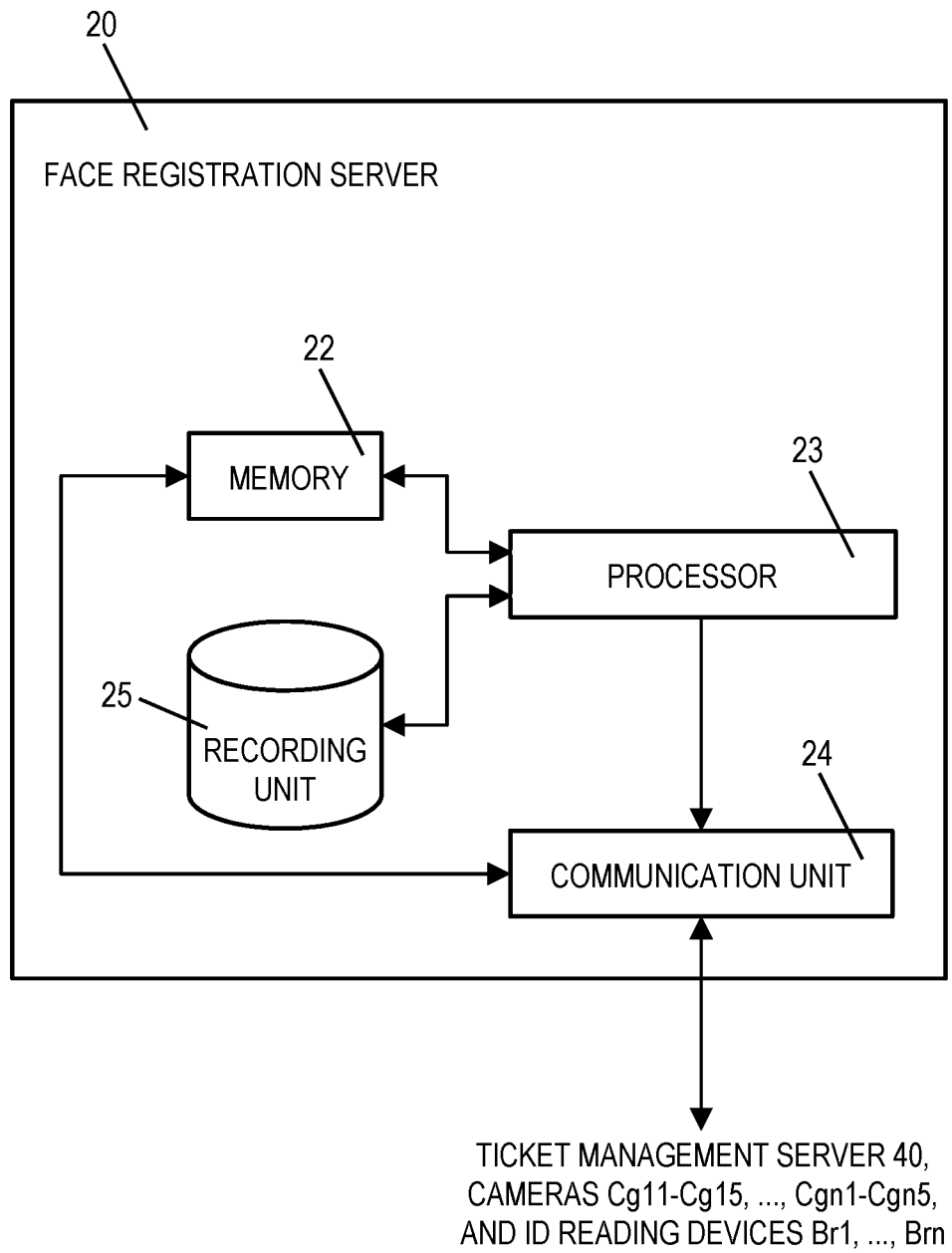
FIG. 6 is a block diagram showing an example hardware configuration of a face registration server.

FIG. 6 is a block diagram showing an example hardware configuration of the face registration server 20. The face registration server 20, which is an example of the term "monitoring apparatus 1" used in the claims, is equipped with a memory 22, a processor 23, a communication unit 24, and a recording unit 25.

The face registration server 20 is an on-premise server or PC that is installed in, for example, the backyard monitoring room of the stadium STM1. The face registration server 20 registers, in the face collation server 30, face images in plural images captured from different angles by each of the sets of cameras Cg11-Cg15 . . . or Cgn1-Cgn5 that are incorporated in the respective visitor face capturing gates Gt1-Gtn (see FIG. 2) in such a manner that the face images are correlated with information relating to a visitor thus shot (e.g., personal information stored in the ticket management server 40). The details of processing for registering face images will be described later with reference to FIG. 10.

The memory 12, which is composed of, for example, a RAM and a ROM, stores programs and data that are necessary for operation of the face registration server 20 and temporarily stores information, data, or the like generated during operation of the face registration server 20. The RAM is a work memory that is used while, for example, the processor 23 is in operation. For example, the ROM is stored with, in advance, programs and data for controlling the processor 23. The memory 22 is stored with, for example, identification information (e.g., serial number) for identification of the face registration server 20 and various kinds of setting information.

For example, the processor 23 is a CPU, an MPU, a DSP, or an FPGA. The processor 23, which functions as a control unit of the face registration server 20, performs control processing for controlling operation of the other units of the face registration server 20 in a centralized manner, processing for data input from and output to the other units of the face registration server 20, data computation (calculation) processing, and data storing processing. The processor 23 operates according to the programs and data stored in the memory 22.

Operating using the memory 22, the processor 23 acquires current time information and acquires, via the communication unit 24, data of images or face images cut out from them that are transmitted from each of the sets of cameras Cg11-Cg15, . . . , or Cgn1-Cgn5 incorporated in the respective visitor face capturing gates Gt1-Gtn. The processor 23 sends, to the face collation server 30, via the communication unit 24, a face registration instruction containing the data of the different face images of the same visitor captured by each of the sets of cameras Cg11-Cg15, . . . , or Cgn1-Cgn5 incorporated in the respective visitor face capturing gates Gt1-Gtn. The face registration instruction contains visitor data in which at least the data of the different face images of the same visitor are correlated with information (e.g., personal information) relating to that visitor.

The communication unit 24 is a communication circuit for enabling communication with the ticket management server 40, the sets of cameras Cg11-Cg15, . . . , Cgn1-Cgn5 incorporated in the respective visitor face capturing gates Gt1-Gtn, and the ID reading devices Br1-Brn. The communication unit 24 sends, to the face collation server 30, on the basis of an instruction from the processor 23, a face registration instruction containing data of plural face images captured from different angles that is held in the memory 22 or the recording unit 25. Furthermore, the communication unit 24 receives ticket information read by one of the ID reading devices Br1-Bm and transmits a personal information acquisition request containing the received ticket information to the ticket management server 40 on the basis of an instruction from the processor 23. For example, the personal information acquisition request is a message for requesting the ticket management server 40 to acquire personal information of the visitor who is the owner of the ticket.

The recording unit 25 is a semiconductor memory (e.g., flash memory), an HDD, or an SSD incorporated in the face registration server 20 or an external storage medium (i.e., a storage medium not incorporated in the face registration server 20) such as a memory card (e.g., SD card). The recording unit 25 records data of plural face images captured from different angles that have been acquired by the processor 23 in such a manner that the data is correlated with identification information of cameras used and capturing time information. Where the recording unit 25 is a memory card, it can be inserted into and removed from the body of the face registration server 20 when desired.

Figure 7:
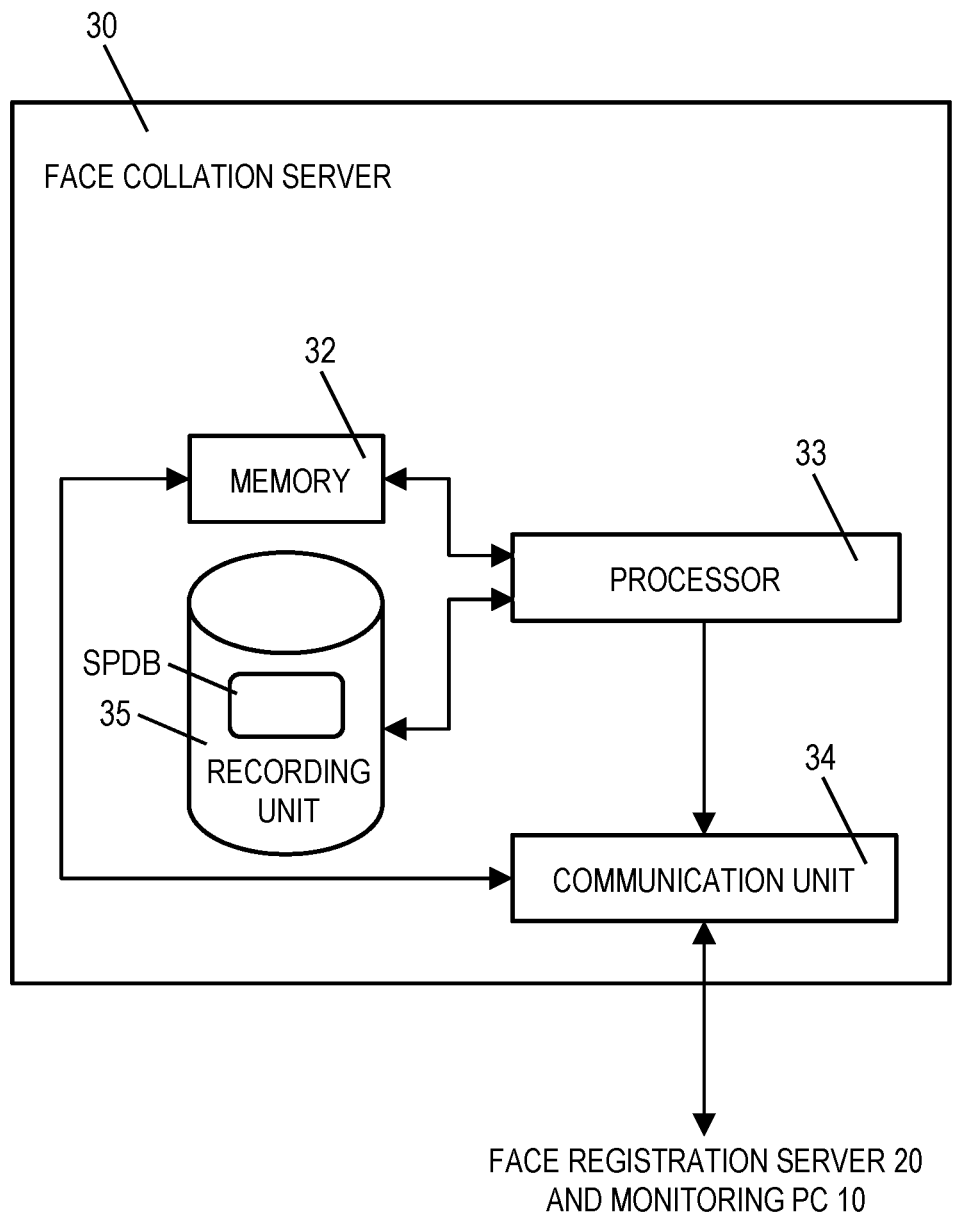
FIG. 7 is a block diagram showing an example hardware configuration of a face collation server.

FIG. 7 is a block diagram showing an example hardware configuration of the face collation server 30. The face collation server 30, which is an example of the term "monitoring apparatus 1" used in the claims, is equipped with a memory 32, a processor 33, a communication unit 34, and a recording unit 35.

The face collation server 30 is an on premise server or PC that is installed in, for example, the backyard monitoring room of the stadium STM1. The face collation server 30 stores, in a visitor database SPDB of the recording unit 35, visitor data in which face images in plural images captured from different angles by each of the sets of cameras Cg11-Cg15, . . . , or Cgn1-Cgn5 that are incorporated in the respective visitor face capturing gates Gt1-Gtn (see FIG. 2) are correlated with information relating to a visitor thus shot (e.g., personal information stored in the ticket management server 40). The details of processing for collating face images will be described later with reference to FIG. 11.

The memory 32, which is composed of, for example, a RAM and a ROM, stores programs and data that are necessary for operation of the face collation server 30 and temporarily stores information, data, or the like generated during operation of the face collation server 30. The RAM is a work memory that is used while, for example, the processor 33 is in operation. For example, the ROM is stored with, in advance, programs and data for controlling the processor 33. The memory 32 is stored with, for example, identification information (e.g., serial number) for identification of the face collation server 30 and various kinds of setting information.

For example, the processor 33 is a CPU, an MPU, a DSP, or an FPGA. The processor 33, which functions as a control unit of the face collation server 30, performs control processing for controlling operation of the other units of the face collation server 30 in a centralized manner, processing for data input from and output to the other units of the face collation server 30, data computation (calculation) processing, and data storing processing. The processor 33 operates according to the programs and data stored in the memory 32.

Operating using the memory 32, the processor 33 acquires current time information and acquires, via the communication unit 34, various data (described above) contained in a face registration instruction received from the face registration server 20. The processor 33 registers and stores (accumulates) the visitor data contained in the face registration instruction in the visitor database SPDB of the recording unit 35. The processor 33 acquires, via the communication unit 34, a collation request sent from the monitoring PC 10, performs collation using the visitor database SPDB according to the collation request, and extracts, as a collation result, feature information of each visitor corresponding to face image data (see FIG. 11) of one or more visitors contained in the collation request.

The communication unit 34 is a communication circuit for enabling communication with the face registration server 20 and the monitoring PC 10. The communication unit 34 receives a face registration request (described above) sent from the face registration server 20 and outputs it to the processor 33. Furthermore, the communication unit 34 sends feature information of each visitor to the monitoring PC 10 as a result of collation performed by the processor 33 in response to a collation request (see FIG. 11).

The recording unit 35 is a semiconductor memory (e.g., flash memory), an HDD, or an SSD incorporated in the face collation server 30 or an external storage medium (i.e., a storage medium not incorporated in the face collation server 30) such as a memory card (e.g., SD card). The recording unit 35 records data of plural face images captured from different angles that have been acquired by the processor 33 in such a manner that the data is correlated with identification information of cameras used and capturing time information.

Furthermore, the recording unit 35 holds the visitor database SPDB in which visitor data of respective visitors who entered the stadium STM1 are registered. The visitor data is data in which at least data of plural face images generated by cutting out face portions from images of the same visitor captured from different angles are correlated with information (e.g., personal information) relating to that visitor. Where the recording unit 35 is a memory card, it can be inserted into and removed from the body of the face collation server 30 when desired.

Figure 9A:
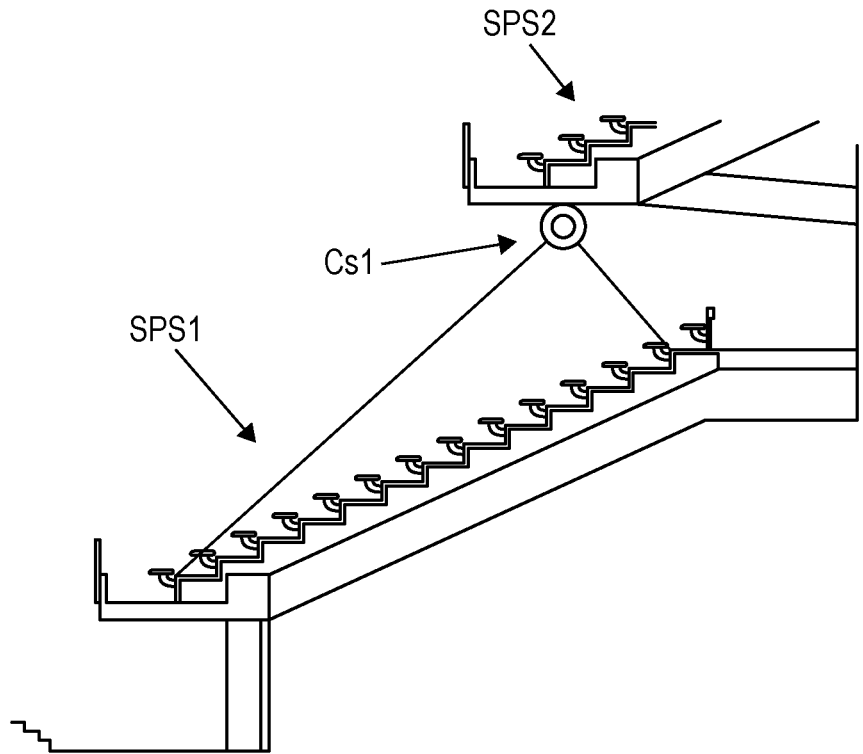
FIG. 9A is a schematic diagram showing how spectator seats of the stadium and an intra-stadium camera are installed.
Figure 9B:
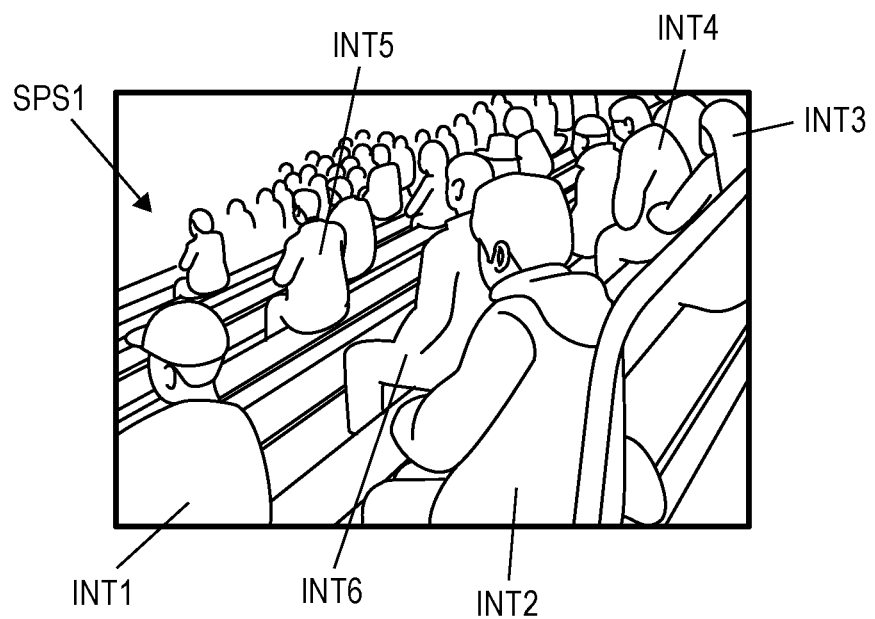
FIG. 9B shows an example image captured by the intra-stadium camera.

FIG. 9A is a schematic diagram showing how spectator seats SPS1 and SPS2 of the stadium STM1 and the intra-stadium camera Cs1 are installed. FIG. 9B shows an example image captured by the intra-stadium camera Cs. It goes without saying that the manners of installation of the spectator seats SPS1 and SPS2 and the intra-stadium camera Cs1 shown in FIG. 9A are just examples and they may be installed in different manners than shown in FIG. 9A. To simplify the description to be made with reference to FIG. 9A, it is assumed that the spectator seats SPS1 are first-floor seats and the spectator seats SPS2 are second-floor seats.

As shown in FIG. 9A, in the stadium STM1, the spectator seats SPS1 are installed stepwise so as to go down as the position goes from right to left in FIG. 9A (i.e., comes closer to the field or pitch of the stadium STM1 where a soccer game, for example, is played). The angle of view of the intra-stadium camera Cs1 is set so as to cover the entire area of the spectator seats SPS1, and the intra-stadium camera Cs1 is attached to, for example, a ceiling surface between the first-floor seats and the second-floor seats. Although not shown in FIG. 9A, like the intra-stadium camera Cs1 installed over the spectator seats SPS1, an intra-stadium camera whose angle of view is set so as to cover the entire area of the spectator seats SPS2 may be installed over the spectator seats SPS2 (e.g., attached to a ceiling surface).

The image shown in FIG. 9B includes spectators (including visitors INT1-INT6) who are setting on spectator seats SPS1. As shown in FIG. 9B, part (not all) of the spectators (e.g., visitors INT1-INT6) sitting on the spectator seats SPS1 are sitting with the intra-stadium camera Cs1 at their backs. In other words, face images of the visitors INT1-INT6 captured by the intra-stadium camera Cs1 are, for example, ones taken from the left-side position or a rear-left position rather than front face images which are suitable for correct collation. Thus, where, for example, only a front face image of each visitor is registered, a problem arises that collation of a face image takes an unduly long time or incurs a heavy processing load.

In contrast, in the embodiment 1, when each spectator (visitor) enters the stadium STM1, he or she necessarily passes through one of the visitor face capturing gates Gt1-Gtn. And face images of a visitor are captured from different angles by, for example, five cameras (e.g., cameras Cg11-Cg15; see FIG. 2) and registered in the visitor database SPDB. Thus, in the event of an abnormality (e.g., bomb explosion incident) in the stadium STM1, feature information of suspects or criminals who may have caused the abnormality can be extracted properly and quickly by collating with the face collation server 30, using the visitor database SPDB, face images of persons found in a video captured by the intra-stadium camera installed at or near the position where the abnormality has occurred.

Next, an operation procedure for registering face images of each visitor who enters the stadium STM1 (face registration) in the monitoring system 100 according to the embodiment 1 will be described with reference to FIG. 10. FIG. 10 is a sequence diagram showing an example operation procedure of face registration in the monitoring system 100 according to the embodiment 1.

The face registration operation procedure shown in FIG. 10 is followed when, for example, a visitor INT0 having a ticket TC1 enters the stadium STM1 through one of the visitor face capturing gates Gt1-Gtn (e.g., visitor face capturing gate Gt1). To facilitate the description to be made with reference to FIG. 10, the description will be made of a case of registering face images of the visitor INT0 having the ticket TC1 for entrance into the stadium STM1.

As shown in FIG. 10, in entering the stadium STM1, the visitor INT0 having the ticket TC1 holds the ticket TC1 over the ID reading device (e.g., ID reading device Br1) that is installed before or at the same position as, for example, the visitor face capturing gate Gt1. The ID reading device Br1 reads a barcode that is, for example, printed on the ticket TC1 and thereby acquires ID information of the visitor INT0. As described above, the ID information contains various kinds of information such as identification information of the ticket TC1 (e.g., indicated by the barcode printed thereon), a name of the visitor INT0 who purchased the ticket TC1, and a purchase date. At step St1, the ID reading device Br1 transmits the ID information obtained by reading the barcode to the face registration server 20.

The face registration server 20 receives the ID information transmitted from the ID reading device Br1 and holds it in the memory 22 or the recording unit 25. At step St2, the face registration server 20 generates a request for acquiring personal information corresponding to the name of the visitor INT0 that is contained in the ID information received at step St1 and sends the generated personal information acquisition request to the ticket management server 40. The personal information acquisition request is a message for requesting the ticket management server 40 to acquire personal information of, for example, the visitor INT0 who is the owner of the ticket TC1.

At step St2, the ticket management server 40 acquires personal information (e.g., various kinds of information for identification of the visitor INT0 such as a name, an age, a gender, an address, and a telephone number) of the visitor INT0 for whom the target person of the personal information acquisition request should be acquired. At step St3, the ticket management server 40 returns, as a response, the acquired personal information of the visitor INT0 to the face registration server 20.

At step St4, the visitor INT0 passes through the visitor face capturing gate Gt1 (see FIG. 2). At this time, at step St5, the plural cameras Cg11-Cg15 which are incorporated in the visitor face capturing gate Gt1 capture the visitor INT0 with prescribed angles of view, respectively. Each of the cameras Cg11-Cg15 extracts a face image by cutting out a face portion of the visitor INT0 from data of an image of the visitor INT0 captured at step St5, and at step St6 the cameras Cg11-Cg15 transmit data of the extracted face images AG1-AG5 captured from different angles in such a manner that they are correlated with each other.

The face image AG1 is a front face image of the visitor INT0 that is generated on the basis of the image captured by, for example, the camera Cg11. The other face images AG2-AG5 are non-front face images (i.e., oblique or side face images) of the visitor INT0 that are generated on the basis of the images captured by, for example, the cameras Cg12-Cg15, respectively.

The face registration server 20 receives the data of face images transmitted from the respective cameras Cg11-Cg15 at step St6. At step St7, the face registration server 20 calculates a face direction (in other words, an angle with respect to a reference angle 0° of the front face image) of each of the received face images. For example, the face directions of the face images AG1-AG5 are calculated to be 0°, 45°, −45°, 135°, −135°, respectively.

At step St8, the face registration server 20 generates, using the calculation results of step St7, visitor data of the visitor INT0 in which the data of the face images AG1-AG5 received at step St6 are correlated with the personal information of the visitor INT0 received at step St3. In this visitor data, the face images AG1-AG5 are also correlated with the respective face directions calculated at step St7.

At step St9, the face registration server 20 generates a face registration instruction to register the visitor data of the visitor INT0 (e.g., the face images of the visitor INT0 captured from the different angles and the personal data of the visitor INT0) generated at step St9 so that the face registration instruction contains the visitor data, and sends the generated face registration instruction to the face collation server 30.

Upon receiving the face registration instruction from the face registration server 20 at step St9, at step St10 the face collation server 30 registers (stores) the visitor data contained in the face registration instruction.

Following the above-described operation procedure, the monitoring system 100 can generate individual visitor data of all visitors who have entered the stadium STM1 and accumulate the generated visitor data in the visitor database SPDB of the face collation server 30. In other words, individual visitor data of all visitors who have entered a closed facility such as the stadium STM1 are accumulated in the visitor database SPDB of the face collation server 30.

Figure 11:
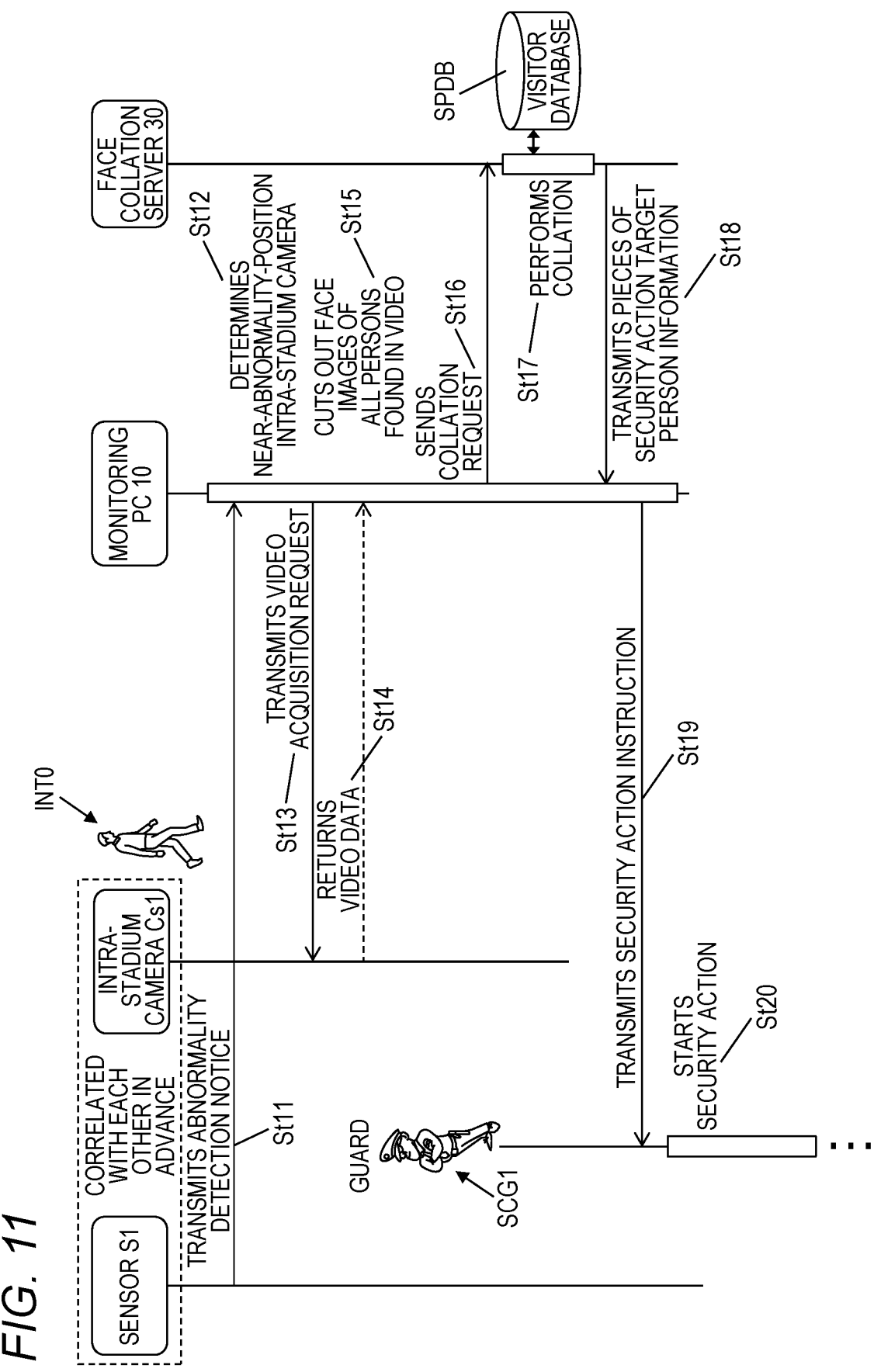
FIG. 11 is a sequence diagram showing an example operation procedure of face collation in the monitoring system according to the embodiment 1.

Next, an operation procedure for collating, using the visitor database SPDB, feature information of suspects or criminals who may have caused an abnormality (e.g., bomb explosion incident) and notifying guards of a result of the collation when the abnormality has occurred in the stadium STM1 in which the monitoring system 100 according to the embodiment 1 is installed will be described with reference to FIG. 11. FIG. 11 is a sequence diagram showing the face collation operation procedure in the monitoring system 100 according to the embodiment 1.

The face collation operation procedure shown in FIG. 11 is followed when an abnormality (e.g., bomb explosion incident) has occurred in the midst of, for example, a soccer game being played in the stadium STM1 in which many (e.g. several tens of thousands of) spectators exist. To facilitate understanding of the description to be made with reference to FIG. 11, a case is assumed that the intra-stadium camera Cs1 and the sensor S1 which is correlated with it are installed at or near a position of occurrence of the abnormality.

Referring to FIG. 11, the sensor S1 detects sudden occurrence of an abnormality (e.g., bomb explosion incident) in the midst of, for example, a soccer game. In response, at step St11, the sensor S1 transmits, to the monitoring PC 10, an abnormality detection notice containing, for example, identification information of the sensor S1 and information to the effect that an abnormality has been detected.

At step St12, the monitoring PC 10 refers to the information relating to the installation positions of the sets of a sensor and an intra-stadium camera that is recorded in the recording unit 15 and determines, as a near-abnormality-position intra-stadium camera, an intra-stadium camera that is installed near the position of occurrence of the abnormality (in other words, a watching target position of guards) on the basis of the identification information of the sensor S1 that is contained in the abnormality detection notice transmitted from the sensor S1 at step St11.

At step St13, the monitoring PC 10 generates a request for acquiring a video captured by the intra-stadium camera determined at step St12 (e.g., intra-stadium camera Cs1) and transmits the generated video acquisition request to the intra-stadium camera Cs1. The video acquisition request is a message for requesting the intra-stadium camera determined at step St12 to acquire data of a video that was being captured at the time of occurrence of the abnormality or started to be captured a prescribed time (e.g., 30 minutes that enable pre-buffering) before that time by the determined intra-stadium camera.

The intra-stadium camera Cs1 acquires data of a video that was being captured at the time of occurrence of the abnormality or started to be captured the prescribed time before that time on the basis of the video acquisition request transmitted from the monitoring PC 10 at step St13. If not having data of a video that was being captured at the time of occurrence of the abnormality or started to be captured the prescribed time before that time, the intra-stadium camera Cs1 may acquire data of a video that was being captured at the time of reception of the video acquisition request transmitted from the monitoring PC 10 at step St13. It is assumed that the video that was being captured at the time of reception of the video acquisition request includes an image of the visitor INT0. At step St14, the intra-stadium camera Cs1 returns, as a response, the acquired video data to the monitoring PC 10.

When receiving the video data transmitted from the intra-stadium camera Cs1 at step St14, at step St15 the monitoring PC 10 cuts out (extracts) face images of all persons found in the video captured by the intra-stadium camera Cs1 (i.e., all visitors including the visitor INT0 that exist in the angle of view of the intra-stadium camera Cs1). At step St16, the monitoring PC 10 generates a collation request containing data of the face images extracted at step St15 and sends the generated collation request to the face collation server 30.

At step St17, the face collation server 30 collates each of the face images of the visitors that were cut out at step St15 with the face images stored in the visitor database SPDB on the basis of the collation request. By performing the collation at step St17, the face collation server 30 generates pieces of security action target person information in each of which the face images of a visitor that were cut out at step St15 are correlated with feature information of the visitor (more specifically, personal information of the visitor containing attribute information such as a name, an age, a gender, an address, and a telephone number and, if necessary, appearance information of the visitor (e.g., clothes and a shoe color)). For example, the face images of the visitor contained in each piece of security action target person information may include not only a front face image (e.g., face image AG1) but also side and/or oblique face images captured by part of the cameras incorporated in a visitor face capturing gate. At step St18, the face collation server 30 transmits the generated one or more pieces of security action target person information to the monitoring PC 10.

As a result, the face collation server 30 can set, as provisional suspects or criminals, all the visitors (e.g., 30 to 40 restricted visitors) who were captured by the intra-stadium camera Cs1 installed at or near the position of occurrence of the abnormality (e.g., bomb explosion incident) instead of all visitors (e.g., several tens of thousands of visitors) who entered the stadium STM1. And the face collation server 30 can inform, via the monitoring PC 10, the guards of the feature information (described above) of all the visitors (e.g., 30 to 40 restricted visitors) who were captured by the intra-stadium camera Cs1 and have been judged to be provisional suspects or criminals. This could efficiently support a criminal investigation to be conducted by a police organization later, that is, after the date of occurrence of the security action or the abnormality in the stadium STM1.

The monitoring PC 10 receives the one or more pieces of security action target person information transmitted from the face collation server 30 at step St118 and generates security action instruction containing the pieces of security action target person information. At step St119, the monitoring PC 10 transmits the generated security action instruction to the security terminals 71-7$p$ held by all the respective guards. Receiving the security action instruction transmitted from the monitoring PC 10, at step St20 each of the guards including a guard SCG1 patrols the stadium STM1 while referring to the face images and the corresponding feature information (personal information) of the visitors that are contained in the security action instruction and searches for a person who seems to be any of those visitors.

As described above, the monitoring system 100 according to the embodiment 1 is equipped with the plural cameras (e.g., cameras Cg11-Cg15) which capture each of visitors from different angles when the visitor enters a facility such as the stadium STM1 in which the plural intra-stadium cameras Cs1-Csk are installed at respective prescribed positions. The monitoring system 100 is also equipped with the monitoring apparatus 1 which is connected to the plural cameras so as to be able to communicate with them, has the recording unit 35 which accumulates visitor data in each of which face images AG1-AG5 that are based on images of a visitor captured from the different angles are correlated with identification information of the visitor, and monitors the visitors in the stadium STM1. In response to a notice of detection of an abnormality in the stadium STM1, the monitoring apparatus 1 determines one, installed at or near a position of detection of the abnormality, of the plural intra-stadium cameras Cs1-Csk as a near-abnormality-position intra-facility camera. The monitoring apparatus 1 extracts one or more visitors found in a video captured by the near-abnormality-position intra-facility camera (e.g., intra-stadium camera Cs1) using the visitor data, employs the extracted one or more visitors as security action target persons, and transmits security action target person information (information relating to the security action target persons) to the security terminals 71-7$p$ held by the respective guards who patrol the stadium STM1.

When an abnormality or the like has occurred in the closed facility such as the stadium STM1, by using face images that were captured by the plural cameras from the plural angles when each visitor entered the stadium STM1, the monitoring system 100 configured in the above-described manner can narrow down the investigation from all the visitors (e.g., several tens of thousands of visitors) to plural restricted visitors (provisional suspects or criminals) who are found in a video captured by an intra-stadium camera that is installed at or near a position of detection of the abnormality. As such, the monitoring system 100 can efficiently support narrowing-down to suspects or criminals who may have caused the abnormality and thereby contribute to early solution of the incident.

The sensors S1-Sk are installed in the stadium STM1 so as to correspond to the plural respective intra-stadium cameras Cs1-Csk. The monitoring apparatus 1 receives an abnormality detection notice to the effect that the abnormality has been detected from a sensor (e.g., sensor S1) that is installed so as to correspond to the near-abnormality-position intra-facility camera (e.g., intra-stadium camera Cs1). With this measure, the sets of a sensor and a corresponding intra-stadium camera are installed, the monitoring system 100 can properly estimate an intra-stadium camera that is installed near a position where an accident such as an incident has occurred on the basis of a sensor from which an abnormality detection notice has been received. Thus, the monitoring system 100 can efficiently determine a position in the stadium STM1 where a suspect or a criminal would exist who may escape immediately.

The monitoring apparatus 1 extracts one or more visitors who are found in a video that was started to be captured by the near-abnormality-position intra-facility camera from a prescribed time before a time of reception of the abnormality detection notice. With this measure, the monitoring system 100 can search, more correctly, a video that may contain an image of a suspect or a criminal who has caused the abnormality such as an incident and hence enables narrowing-down to visitors as security action target persons.

The monitoring apparatus 1 extracts, as the security action target person, at least one visitor who is selected from the one or more visitors found in the video captured by the near-abnormality-position intra-facility camera by a manipulation of an observer. With this measure, the monitoring system 100 can select and set as the security action target person at least one suspicious person who has caught the eyes of the observer among the visitors found in the video captured by the intra-stadium camera that is installed at or near the position of occurrence of the abnormality such as an incident. Thus, a visitor who produces a more characteristic atmosphere can be determined efficiently as the security action target person.

The monitoring apparatus 1 accumulates, in the recording unit 35, as the visitor data, data in each of which face images in images of a visitor captured from the different angles are correlated with identification information of the visitor and color information of clothes and other things of the visitor. With this measure, in the monitoring system 100, by registering visitor data that contains not only face images of a visitor but also features in appearance such as clothes of the visitor that he or she exhibited in entering the stadium STM1, the accuracy of collation for determining provisional suspects or criminals who may have caused an abnormality such as an incident can be increased.

Although the embodiment has been described above with reference to the drawings, it goes without saying that the disclosure is not limited to the embodiment. It is apparent that those skilled in the art would be able to conceive various changes and modifications within the confines of the claims. And such changes or modifications should naturally be construed as being included in the technical scope of the disclosure.

In the embodiment 1, the operation procedure for face collation is started in response to an abnormality detection notice transmitted from a sensor that is disposed at or near a position where an abnormality has occurred. And security action target persons are determined using all visitors who are found in a video captured by the intra-stadium camera (e.g., intra-stadium camera Cs1) corresponding to the sensor (e.g., sensor S). However, the concept of the disclosure is not limited to the case of determining security action target persons using only a video captured by, for example, the intra-stadium camera Cs1. For example, the monitoring PC 10 may determine security action target persons using all visitors who are found in videos captured by intra-stadium cameras other than the intra-stadium camera Cs1 (e.g., intra-stadium cameras installed near the intra-stadium camera Cs1). By the monitoring system 100, this makes it possible to efficiently pursue a suspect or a criminal or enables narrowing-down to suspects or criminals in real time even in a case that the suspect or criminal has moved to a nearby position that is distant from the site of an accident (e.g., bomb explosion incident) by a certain distance taking into consideration that the suspect or criminal may have escaped from the site.

The present application is based upon Japanese Patent Application (Patent Application No. 2018-034023) filed on Feb. 28, 2018, the contents of which are incorporated herein by reference.

What is claimed is:

1. A monitoring system comprising:
a plurality of entrance cameras positioned at an entry point and that capture a respective plurality of images of each of visitors from multiple different angles when the each of visitors enters a facility at the entry point and in which a plurality of intra-facility cameras are installed at respective prescribed positions; and
a monitoring apparatus that is connected to the plurality of entrance cameras so as to communicate with the plurality of entrance cameras, has a storage that accumulates visitor data which associates the plurality of captured images of the each of visitors captured from the multiple different angles with identification information of the each of visitors, and monitors the each of visitors in the facility, wherein the monitoring apparatus:
specifies one intra-facility camera installed at or near a position of detection of an abnormality among the plurality of intra-facility cameras as a near-abnormality-position intra-facility camera in response to a notice of detection by a sensor of an abnormality in the facility;
extracts images of all of the visitors found in a video captured by the near-abnormality-position intra-facility camera;
collates the extracted images of all of the visitors with some or all of the plurality of captured images of the each of the visitors captured by the plurality of entrance cameras; and
based on the collation, identifies some of the visitors as security action target persons and transmits information on the security action target persons to terminals.

2. The monitoring system according to claim 1, wherein:
the sensor comprises a plurality of sensors that are installed in the facility so as to associate with each of the plurality of intra-facility cameras, and
the monitoring apparatus receives the notice of detection of the abnormality that has been detected from a sensor that is installed and corresponded to the near-abnormality-position intra-facility camera.

3. The monitoring system according to claim 1, wherein the monitoring apparatus extracts the images of all of the visitors who are found in the video captured by the near-abnormality-position intra-facility camera from a prescribed time before a time of reception of the notice of detection of the abnormality.

4. The monitoring system according to claim 1, wherein the monitoring apparatus extracts, as the security action target person, at least one image of a visitor that is selected from the images of all of the visitors found in the video captured by the near-abnormality-position intra-facility camera by a manipulation of an observer.

5. The monitoring system according to claim 1, wherein the monitoring apparatus accumulates the visitor data which associates each face image in images of the visitor captured from the multiple different angles, with identification information of the visitor and color information of clothes of the visitor.

6. The monitoring system according to claim 1, wherein the terminals are portable.

7. A monitoring method implemented by a monitoring system, the monitoring system including a plurality of entrance cameras positioned at an entry point and that capture a respective plurality of images of each of visitors from multiple different angles when the each of visitors enters a facility at the entry point and in which a plurality of intra-facility cameras are installed at respective prescribed positions; and a monitoring apparatus that is connected to the plurality of entrance cameras so as to communicate with the plurality of entrance cameras, has a storage that accumulates visitor data which associates the plurality of captured images of the each of visitors captured from the multiple different angles with identification information of the each of visitors, and monitors the each of visitors in the facility, the method comprising, determining one intra-facility camera installed at or near a position of detection of the abnormality among the plurality of intra-facility cameras as a near-abnormality-position intra-facility camera in response to a notice of detection by a sensor of an abnormality in the facility;

extracting images of all of the visitors found in a video captured by the near-abnormality-position intra-facility camera;

collating the extracted images of all of the visitors with some or all of the plurality of captured images of the each of the visitors captured by the plurality of entrance cameras; and based on the collating, identifying some of the visitors as security action target persons and transmitting information on the security action target persons to terminals.

8. The monitoring method according to claim 7, wherein the terminals are portable.

* * * * *